Sept. 18, 1962 M. P. LAURENT 3,054,173
METHOD OF ASSEMBLING PRESSURE SEALED
JOINTS IN HOLLOW VESSELS
Filed June 16, 1954 2 Sheets-Sheet 1

INVENTOR
Milton P. Laurent
BY
ATTORNEY

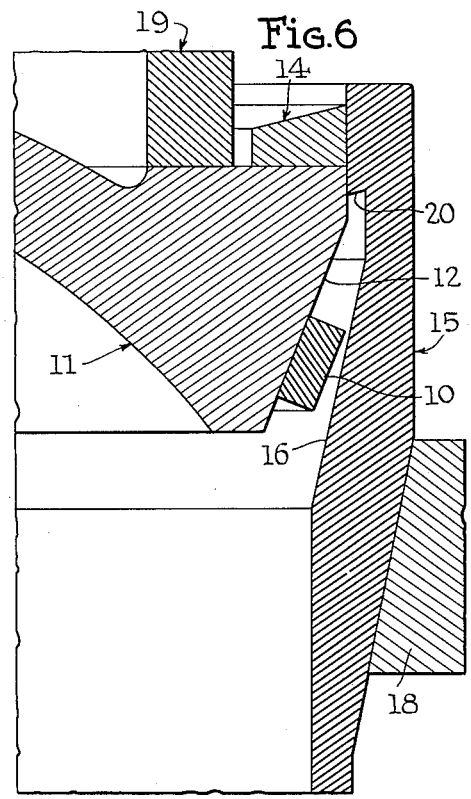
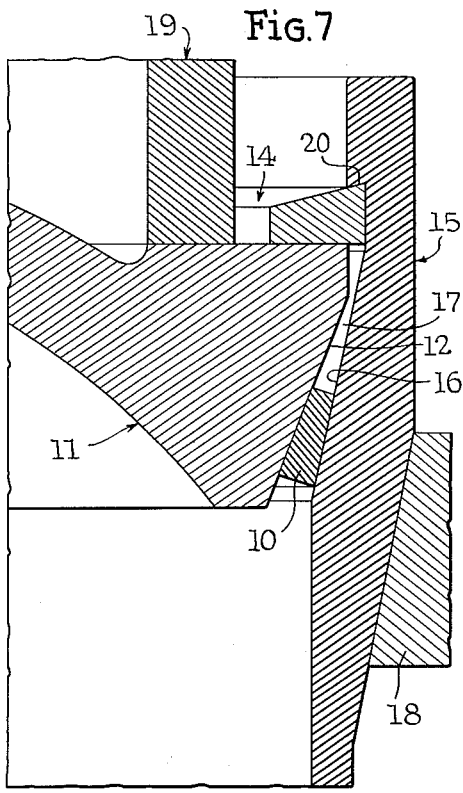
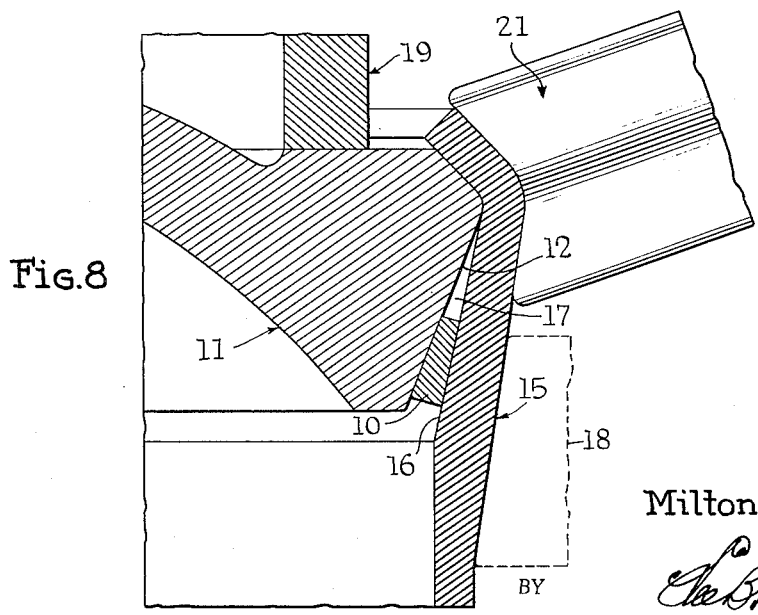

United States Patent Office 3,054,173
Patented Sept. 18, 1962

3,054,173
METHOD OF ASSEMBLING PRESSURE SEALED JOINTS IN HOLLOW VESSELS
Milton P. Laurent, Houston, Tex.; Frank A. Rudman, John J. Roach, and Ruby Sandoz Laurent, executors of said Milton P. Laurent, deceased
Filed June 16, 1954, Ser. No. 437,243
3 Claims. (Cl. 29—453)

This invention relates to pressure vessels, and more particularly to a method of assembling a pressure sealed joint for the closure to such a vessel.

While the invention is believed to have broad application, it will be described herein with reference to a particular pressure vessel for which it was originally designed. So-called "JATO" units are now in widespread use, for enabling airplanes to get off the ground (take-off) more quickly, even under heavy loads. These devices are commonly attached to the under side of the airplane wings, and are jettisoned once they have served their purpose of providing additional thrust to get the plane off the ground. In general, these units comprise substantially cylindrical vessels filled with a solid rocket propellant. An opening at the rear end of these vessels is customarily provided with a frangible seal. The pressure conditions existing within the vessel are unusual and extremely demanding of an initial pressure-tight seal. Upon ignition of the solid propellant charge, in devices currently in use, the pressure may rise from zero to around 2,000 pounds per square inch, almost instantaneously. This pressure is then maintained until the propellant charge is substantially exhausted. Shortly following the initial rise in pressure, the frangible seal is destroyed thereby, and the unit acts as a rocket to provide the desired additional thrust.

Another aspect of these "JATO" devices which requires careful consideration, from a purely economical standpoint, is the fact that they are used only once and are then discarded. Consequently, the closures must be cheap, easy to manufacture, and yet able to withstand the severe pressure conditions existing under actual use.

Accordingly, it is the primary object of this invention to provide a method of assembling the closure and sealing means for these high pressure containers, in a manner which will lend itself to mass production techniques, and extreme low cost.

A complete understanding of this invention may be had from reading the following specification and claims, in conjunction with the attached sheets of drawing, in which:

FIGURE 6 is a partial side elevation, in section, showing parts positioned for carrying out the assembly method of this invention;

FIGURE 7 is a view similar to FIGURE 6 showing the parts in their final sealed assembled relation; and FIGURE 8 shows a modification of the assembly shown in FIGURE 7.

For illustrative purposes, the joint to which the method of assembly of this invention is to be described, is a joint which when fully assembled is similar to those shown in my copending application, Serial No. 340,119, filed March 3, 1953, now Patent No. 2,687,229. The finished joint, therefore, includes a closure member fixed with respect to the vessel but defining with the vessel, an annular interval which narrows outwardly of the vessel. A portion of this interval is filled by an annular elastic metal ring so that fluid pressure within the vessel tends to drive the ring into the narrower portion of the interval.

Figure 1:
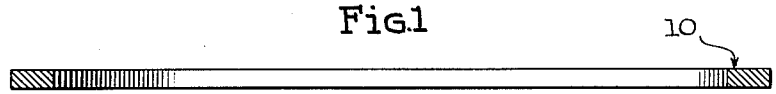
FIGURES 1 and 2 are side elevational views, in section, showing steps in the initial forming of a sealing ring.
Figure 2:
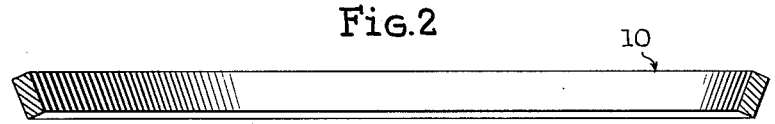
Figure 3:
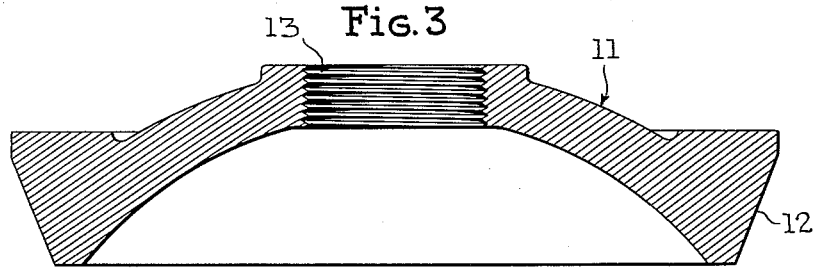
FIGURE 3 is a side elevation in section of the vessel closure.
Figure 4:
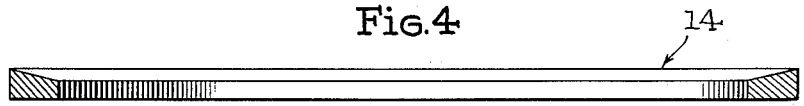
FIGURE 4 is a side elevation in section of a preferred embodiment of a snap ring which serves to hold the various parts in assembled relation.
Figure 5:
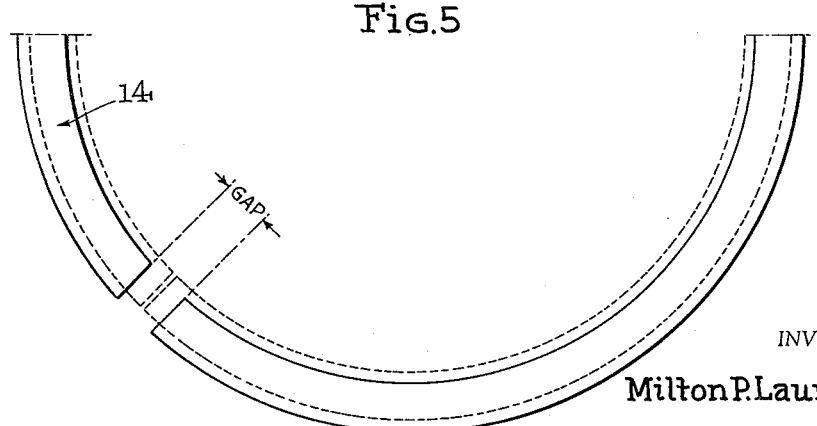
FIGURE 5 is a partial top plan view of the ring shown in FIGURE 4.

Referring now to FIGURES 1 and 2 of the drawing, there is shown a sealing ring 10 in two stages of its formation. As shown in FIGURE 1, the ring comprises a flat annulus which may be cast, or stamped from sheet metal of suitable guage. FIGURE 2 shows the same ring after it has been struck by a forming die to give it a shape intermediate that shown in FIGURE 1 and that which it will asume in its finally assembled position in the vessel. In FIGURE 3 there is shown a closure member 11 which includes a tapered sealing surface 12 and a threaded opening 13. The latter opening, in the case of a "JATO" unit, is to accommodate the frangible seal mentioned hereinbefore. FIGURES 4 and 5 illustrate a snap ring 14 which may be used to hold the various parts in assembled relation as will be hereinafter more fully described. Suffice to note at this point, this ring is discontinuous, as shown, in order that it may be compressed to a smaller diameter during the initial portion of the assembly operation.

FIGURE 6 shows the parts in position to be assembled in the mouth or opening of the vessel 15. The inner vessel wall includes a tapered portion 16 which, together with the tapered surface 12 of the closure, define in their assembled relation an interval 17 which narrows outwardly of the vessel. In accordance with the teaching of my aforementioned copending application, the two tapers are angularly different. Surface 12 is inclined at a greater angle to the centerline of the vessel than is surface 16. The ring 10 will ultimately be positioned between these two surfaces and in sealing engagement with each. The snap ring 14 in its unstressed condition has a diameter which exceeds the inside diameter of the pressure vessel at the point shown in FIGURE 6.

To effect assembly of the described parts, they are first positioned as shown in FIGURE 6. Initial forming of the sealing ring 10 may serve to substantially conform its inner surface to the outer sealing surface 12 of the closure. The ring's outer surface, however, is at this stage not in conformity with the inner tapered sealing surface 16 of the vessel. Snap ring 14 in the position shown in FIGURE 6 is compressed to a diameter substantially smaller than its normal unstressed diameter. With the vessel supported circumferentially as indicated at 18, a downwardly acting force is applied to the closure through a suitable ram member, or the like, diagrammatically shown at 19. As a result, the closure and ring are forced downwardly into the vessel opening, and the seal ring becomes subjected to a drawing operation between the surfaces 12 and 16. As a result of this drawing, both inner and outer surfaces of the ring 10 are coin finished into sealing engagement with the outer sealing surface 12 of the closure and the inner sealing surface 16 of the vessel. At this point, the closure has traveled down into the mouth of the vessel a sufficient distance to allow the snap ring 14 to expand outwardly under the shoulder 20 which is undercut at an angle as shown. Expansion of the snap ring into this position as shown in FIGURE 7 serves to fix the closure within the mouth of the vessel and serves further by reason of the undercut shoulder 20 to resist hoop tension in the vessel mouth which might otherwise allow the entire assembly to be blown outwardly when the propellant charge is ignited. As shown in FIGURE 7, the assembly operation has substantially changed the cross section of the ring 10, so that its larger end is exposed to fluid pressure within the vessel.

In lieu of the snap ring 14, FIGURE 8 is illustrative of another means for retaining the parts in assembled relation. Following application of force to the die member 19 sufficient to cause sealing engagement between the vessel, the ring, and the closure, a roller 21 may be employed to bend the upper edge of the vessel inwardly to a point where it overlies a portion of the closure. FIGURE 8 is illustrative.

While the seal ring has been described as being initially formed by stamping operations, it will be obvious that it could also be cast initially to the form shown in either of FIGURES 2 and 6 or 7 and 8. Stamping, however, is perhaps the most economical procedure.

A significant aspect of the present invention is that it combines, in one step, an assembly and forming operation to provide a pressure sealed joint. Even though the ring 10 is substantially completely preformed, the assembly produces a coined finish on the ring sealing surfaces which enables the thus assembled joint to withstand an instantaneous pressure rise from atmospheric to as much as 3000 p.s.i. test without leakage.

I claim:

1. The method of assembling a pressure sealed type closure to a hollow pressure vessel in which the outer sealing surface of the closure member and the inner sealing surface of the vessel in assembled relation define an interval narrowing in the direction in which fluid pressure within the vessel acts, and in which a substantially rigid but drawable metallic gasket ring member including inner and outer sealing surfaces is positioned between the vessel and the closure sealing surfaces to form a pressure tight seal, the steps comprising: positioning the closure and a partially formed gasket ring member in the vessel opening in partially assembled relation; forcing the closure and gasket into the vessel by sufficient pressure to substantially permanently deform the cross sectional configuration of the gasket ring by drawing the same and coin finish its sealing surfaces, both solely by the assembling operation, to effect sealing engagement between the ring and closure and vessel, while maintaining the circumferential wall of the vessel, at the sealing area against substantial deformation or enlargement; and simultaneously positioning an expansible snap ring between and in contact with the outer surface of the closure and an inwardly extending shoulder on the inner surface of the vessel opening to secure the vessel closure and gasket ring in assembled relation.

2. The method of assembling a pressure sealed type closure to a hollow pressure vessel in which the outer sealing surface of the closure member and the inner sealing surface of the vessel in assembled relation define an interval narrowing in the direction in which fluid pressure within the vessel acts, and in which a substantially rigid but drawable gasket ring member including inner and outer sealing surfaces is positioned between the vessel and closure sealing surfaces to form a pressure tight seal, the steps comprising: positioning the closure and a partially formed gasket ring member in the vessel opening in partially assembled relation; forcing the closure and gasket into the vessel by sufficient pressure to substantially permanently deform the cross-sectional configuration of the gasket ring by drawing the same and coin finish its sealing surfaces both solely by the assembling operation, to effect sealing engagement between the ring and the closure and vessel, while maintaining the circumferential wall of the vessel, at the sealing area, against substantial deformation or enlargement; and simultaneously positively securing the closure in the thus assembled and sealing relation with the vessel by positioning an expansible snap ring between and in contact with the outside of the closure and a shoulder on the inner surface of the vessel opening to secure the vessel closure and gasket ring in assembled relation.

3. The method of assembling a pressure sealed type closure to a hollow pressure vessel in which the outer sealing surface of the closure member and the inner sealing surface of the vessel in assembled relation define an interval narrowing in the direction in which fluid pressure within the vessel acts, and in which a substantially rigid but drawable gasket ring member including inner and outer sealing surfaces is positioned between the vessel and closure sealing surfaces to form a pressure tight seal, the steps comprising: positioning the closure and a partially formed gasket ring member in the vessel opening in partially assembled relation; forcing the closure and gasket into the vessel by sufficient pressure to substantially permanently deform the cross-sectional configuration of the gasket ring by drawing the same and coin finish its sealing surfaces both solely by the assembling operation, to effect sealing engagement between the ring and the closure and vessel, while maintaining the circumferential wall of the vessel at the sealing area, against substantial deformation or enlargement; and positively securing the closure in the thus assembled and sealing relation with the vessel by rolling the edge of the vessel inwardly to overlie at least a portion of the closure.

References Cited in the file of this patent

UNITED STATES PATENTS

| | | |
|---|---|---|
| 402,627 | Smith | May 7, 1889 |
| 1,992,793 | Welter | Feb. 26, 1935 |
| 2,000,276 | Crow | May 7, 1935 |
| 2,079,646 | Abegg | May 11, 1937 |
| 2,329,770 | Knox | Sept. 21, 1943 |
| 2,384,324 | Martin | Sept. 4, 1945 |
| 2,401,231 | Crawford | May 28, 1946 |
| 2,424,449 | Gasche | July 22, 1947 |
| 2,445,777 | Hahn | July 27, 1948 |
| 2,582,995 | Laurent | Jan. 22, 1952 |
| 2,582,997 | Laurent | Jan. 22, 1952 |
| 2,586,087 | Reynolds | Feb. 19, 1952 |
| 2,587,840 | Gruetjen | Mar. 4, 1952 |
| 2,613,015 | Keating | Oct. 7, 1952 |
| 2,687,229 | Laurent | Aug. 24, 1954 |

FOREIGN PATENTS

| | | |
|---|---|---|
| 943,654 | France | Oct. 11, 1948 |